United States Patent [19]

Flower et al.

[11] 3,793,180

[45] Feb. 19, 1974

[54] LASER-RECTICLE ELECTROPHORESIS INSTRUMENT

[75] Inventors: Robert A. Flower, White Plaines, N.Y.; Ivan A. Greenwood, Stamford, Conn.

[73] Assignee: The Singer Company, Little Falls, N.J.

[22] Filed: Mar. 21, 1972

[21] Appl. No.: 236,616

[52] U.S. Cl. .............................. 204/299, 204/180 R
[51] Int. Cl. ............................................. B01k 5/00
[58] Field of Search . 204/180 R, 299; 356/102, 103

[56] References Cited
UNITED STATES PATENTS

| | | | |
|---|---|---|---|
| 2,379,158 | 6/1945 | Kalischer | 356/102 X |
| 2,412,602 | 12/1946 | Chambers et al. | 204/180 R X |
| 2,494,441 | 1/1950 | Hillier | 356/102 X |
| 3,320,148 | 5/1967 | Skeggs | 204/180 R |
| 3,454,487 | 7/1969 | Riddick | 204/299 |
| 3,498,905 | 3/1970 | Strickler | 204/180 R X |
| 3,511,227 | 5/1970 | Johnson | 128/2.05 |
| 3,519,353 | 7/1970 | Franz et al. | 356/102 |
| 3,523,733 | 8/1970 | Kling et al. | 356/102 X |

*Primary Examiner*—John H. Mack
*Assistant Examiner*—A. C. Prescott
*Attorney, Agent, or Firm*—S. A. Giarratana et al.

[57] ABSTRACT

An improved instrument is provided for measuring electrophoretic mobility by reticle velocity measurements of laser illuminated particles. The instrument of the invention finds particular utility in industrial processing of colloidal suspensions, and particularly in the purification of industrial and drinking water. A laser beam is provided in the instrument of the invention which is focused on the particles in the sample solution which is contained in an electrophoretic cell. A reticle or grating is positioned such that the reflection of the laser beam from the particles passes through the reticle to a photo-tube placed on the other side of the reticle. Then, as the particles move through the solution the photo-tube is intermittently illuminated through the reticle and, as a result, generates a train of electric pulses whose frequency is directly proportional to the velocity of the particles, and is therefore a measure of electrophoretic mobility.

7 Claims, 1 Drawing Figure

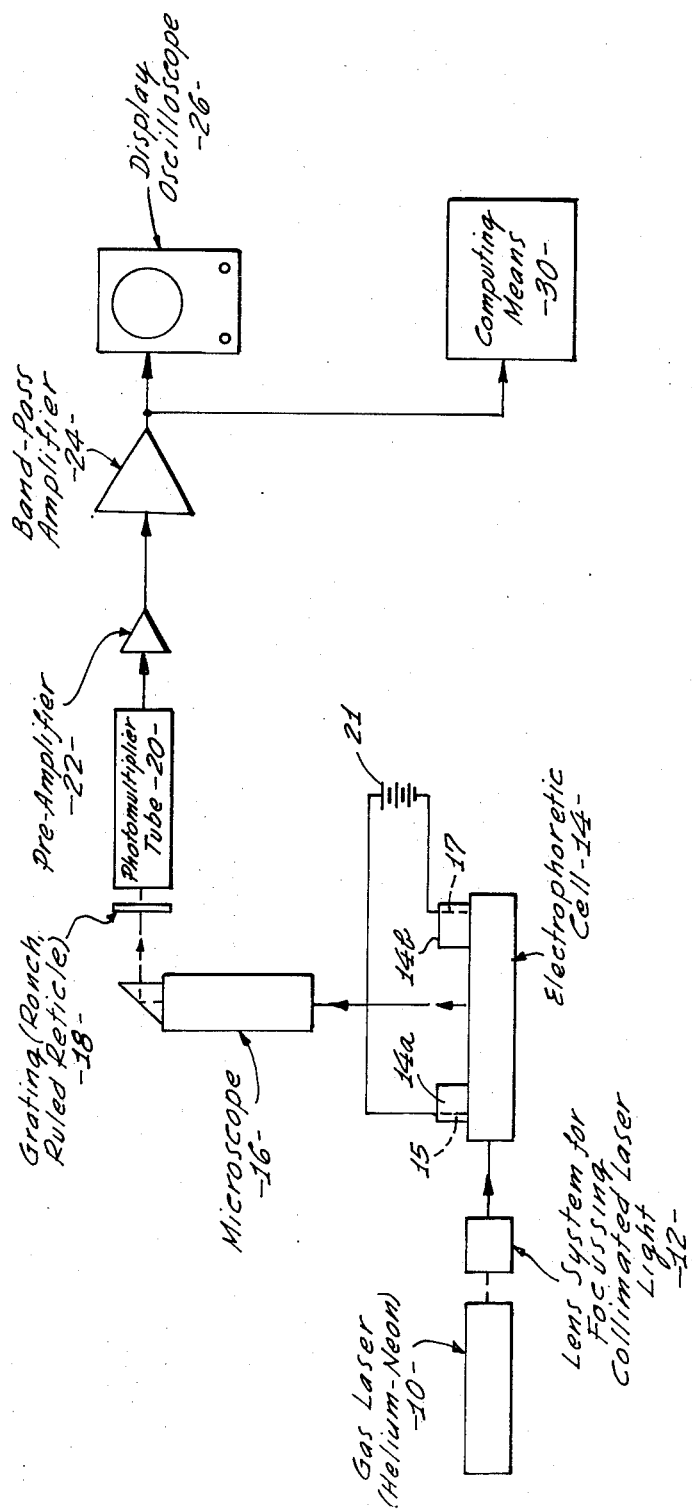

LASER-RECTICLE ELECTROPHORESIS INSTRUMENT

BACKGROUND OF THE INVENTION

The principal function of the instrument of the invention is to measure the Zeta potential of colloidal particles dispersed in a solution, the Zeta potential being a function of the electrophoretic mobility of the particles. The term "Zeta potential" is used in the field of colloidal chemistry as an indication of the electrophoretic mobility of particles colloidally suspended in a solution. The electrophoretic mobility, in turn, is an indication of the velocity of the particles through the solution under the effect of an applied electric field.

When an electric potential is applied to the electrodes of an electrophoretic cell, the particles migrate generally under the influence of the resulting electric field towards the positive electrode. This migration can be observed under a microscope, as is the standard velocity measurement technique in the prior art electrophoresis apparatus. Such apparatus is described, for example, in U.S. Pat. No. 3,454,487 which issued July 8, 1969 in the name of Thomas M. Riddick, and the electrophoretic cells described in the patent are often referred to in the art as "Riddick cells". The electrophoretic mobility, that is the velocity of the particles per unit field strength, is measured in the Riddick cells by timing the particles viewed through the microscope across a fixed distance in an observation chamber under an electric field of known strength. By this means, the mobility of the individual particles of different shapes and sizes can be measured.

The present invention provides an improved system and instrument, whereby the electrophoretic mobility of the particles is measured by causing them to move in a laser beam across a grating or reticle, and then by causing the resulting modulated laser beam to be incident upon a photoelectric transducer, such as a photomultiplier. As a result, the photomultiplier produces electric pulses whose frequency is a measure of the electrophoretic mobility. By use of the instrument of the present invention, the electrophoretic mobility of the particles can be measured automatically, since the electric pulses can be introduced to any appropriate recording or processing system.

The migration of the colloidal particles occurs because charged groups and ions adsorbed on the surface produce a non-uniform distribution of ions in solution at the particle-liquid interface. This distribution is generally expressed in terms of the Zeta potential (volts) which may be calculated from the mobility Zeta potential = $4\pi n v / D$ where:
  $n$ and $D$ are the viscosity and dielectric constant respectively of the medium; and $v$ is the electrophoretic mobility of the particles, that is the velocity per unit field strength.

The surface charge density in electrostatic units per square centimeter can be calculated from the Zeta voltage.

The present invention provides automatic instrumentation capable of measuring Zeta potential, particle size distribution, total charge density, and other distribution functions of aqueous suspensions typical of those encountered in the water processing industry. The use of the automatic instrumentation of the present invention is advantageous in that it serves to reduce human error, and thereby improves the speed, accuracy and reliability of the measurements, as compared with the time consuming prior art techniques such as described in the Riddick patent, in which visual observations of the particle movement through a microscope must be timed and tabulated.

The instrumentation of the present invention is also capable of yielding particle-size-distribution information. Moreover, by combining Zeta potential and particle size measurements of individual particles, summed over many particles, total charge density and other useful derivative functions may also be obtained. It might be pointed out that the total charge density is an important parameter, in that it can provide a processing plant operator much needed information as to how much additive the processing requires.

As described briefly above, the instrument of the present invention uses a laser as a light source, together with a photocell-optical grating read-out which produces electrical signals providing measurements of the Zeta potential on individual colloidal particles moving electrophoretically in an electric field under the influence of a voltage gradient. As will be described, when the individual particles move under the influence of the voltage gradient, and their optical images are focused on a bar reticle having, for example, 300 line pairs/centimeter, a modulated optical signal results. This signal is picked up in the instrument of the invention by a photo-detector, and the resulting electrical signals are analyzed and processed by appropriate electronic circuitry.

Since the frequency of the electric signal is a measurement of the particle velocity, it is also a measure of Zeta potential. Furthermore, the signal amplitude from each particle will be some function of the particle size and shape. Since Zeta potential measurement yields essentially a measure of charge density on the surface of the particle, this measurement, together with a determination of the particle size, can yield an approximation of the total charge on the particle. Then, by integrating over a number of such information originating in a defineable volume of samples, an approximation of the total charge density in the liquid can be obtained.

BRIEF DESCRIPTION OF THE DRAWING

The single FIGURE is a schematic representation of an instrument constructed to incorporate the principles of the present invention.

DETAILED DESCRIPTION OF THE ILLUSTRATED EMBODIMENT

The instrument, as shown in the schematic representation incorporates a laser as a light source. The laser is designated 10. For example, a Spectraphysics Model 131 helium-neon gas laser with focusing optics 12 has been found satisfactory for the production of a laser beam at $\lambda + 6,328A$. Even in finished water, particles not visible with the illuminator of the Riddick meter outfit, such as described in the U.S. Pat. No. 3,454,487, are visible under laser light at the aforesaid wavelength, and their electrophoretic mobility can be measured.

The sample may be contained in a sample cell 14 which may, for example, be similar to the Riddick sample cell. As described in the Riddick U.S. Pat. No. 3,454,487, the sample cell includes a tubular passage which runs longitudinally through the base from a first sample receiving cup 14a to a second sample receiving cup 14b. In this way, the flow path is provided through the base between the two sample cups. Electrodes 15 and 17 are positioned in the cups 14a and 14b in direct contact with the liquid in the respective cups. The electrodes are connected to an appropriate direct current voltage source, represented by a battery 21.

The focused light from the laser 10 is directed through the cell 14 and to a microscope 16 in such a way that the vertical axis of the optical field of the microscope corresponds with a vertical diameter of the passage in the base of the cell 14. The laser illumination is reflected across the passage to be incident on the objective of the microscope. A Bausch and Lomb stereo-zoom binocular microscope without an eyepiece has been found to be suuitable as the microscope 16, and it serves to magnify the images of the particles drifting in the liquid and to project real images of the particles onto a grating, or reticle, 18. The grating 18 may be a Ronchi ruled reticle of, for example, 750 line pairs/inch.

The microscope 16 provides, for example, a magnification of 2.5. The grating 18 is positioned directly in front of the entry face of a photomulitplier tube 20, or other equivalent photoelectric detector. The photomultiplier tube 20 may be of the type marketed by Electrical Musical Industries, and designated by them as their Type 9558C. The output of the photomultiplier tube 20 may be amplified by a pre-amplifier 22, and then further amplified by a wideband bandpass amplifier 24 whose output, for example, may be applied to a display oscilloscope 26. The oscilloscope 26 may, for example, be a Tektronix Model 545 oscilloscope. The voltage source 21, may, for example, supply a direct current voltage of the order of 500-volts to the electrophoretic cell 14 to provide relatively large driven particle velocities.

The output of the amplifier 24, as mentioned above, is a train of pulses, the frequency of which is a measurement of the electrophoretic particle velocity, and the amplitude of which is a measure of particle size. The output of the amplifier may be applied to any appropriate computing means 30. The Zeta potential may be derived in the computing means from the electrophoretic velocity as represented by the frequency of the pulses. The surface charge density of each particle may also be determined in the computing means. Moreover, the size of the particles may be computed from the amplitude of the pulses. Finally, by counting the particles per unit of time, the total number of particles within a volume unit can then be determined in the computing means.

The total charge per unit volume may be determined in the computing means 30 from the summation of the computed charge on each particle over a period of time which depends on the measured electrophoretic velocity. Particle size and Zeta potential distributions may be determined in the computing means by recording the size and Zeta potentials of the particles, and the number of each size and different Zeta potentials.

The representation of the drawing is of the basic instrument. It is evident that many different outputs may be provided from the laser-reticle-photodetector measurement of particle velocity by the instrument. For example, sharp event marker pulses may be generated each representing the instant that the image of an individual particle crosses a dividing line between the opaque and transparent portions of the reticle, if at the same instant the particle signal is above some predetermined threshold. These marker pulses are suitable, for example, for driving standard counter circuits. Moreover, by making the opaque reticle bars reflective, and by observing the reflected signal with a second photodetector, two analog voltage outputs can be provided which represent the sum and difference, respectively, of the outputs from the two photodetectors. Also, a gate signal may be produced which indicates that a particle above the particular threshold is being observed.

With the foregoing information, a wide variety of manual and/or automatic computations can be performed. For example, by feeding the cross-over event markers and the gate signal into a standard counter, the particle velocity and hence Zeta potential can be obtained. In addition, by recording the photocell sum and difference channel outputs on a standard two-channel paper chart recorder, Zeta potential measurements can be obtained by measuring the interval between difference channel zero crossings. Moreover, by observing the peak in the sum channel analog signal, an estimate of particle size can be made.

In addition to the above-mentioned, other derivative functions may be obtained which are of importance in the quantitative control of a water purification process. Specifically, by combining the Zeta potential and the size information, together with the number of particles observed in a given length of time from a known volume, a measure of total charge density can be obtained. Frequency distribution of Zeta potentials can be obtained from the individual Zeta potential measurements. Zeta potential can be plotted as a function of particle size to establish the identification of several types of particles mixed together in a given suspension.

It will be appreciated, therefore, that the instrument of the invention, having the inherent ability to convert electrophoretic mobility measurements into electrical outputs, has a wide field of use since it enables automatic measurements to be made, and automatic controls to be effectuated.

Therefore, although a particular embodiment of the invention has been shown and described, modifications may be made, and it is intended in the following claims to cover the modifications that fall within the spirit and scope of the invention.

What is claimed is:

1. An instrument for measuring the electrophoretic mobility of particles dispersed in a liquid and under the influence of an electric field, said instrument including:
   an electrophoretic cell for receiving and holding a liquid sample having electrophoretic particles therein and in which said particles migrate under the influence of an electric field; 'means for illuminating the particles migrating in said sample by a light beam;
   a microscope positioned to receive the light beam from the cell;
   an optical grating positioned in the optical path from said microscope to modulate the light beam in accordance with movement of said migrating particles; and
   photodetector means positioned to receive the modulated light beam from said grating for producing electric pulses having a frequency related to the velocity of said migrating particles.

2. The instrument defined in claim 1, in which said electrophoretic cell has a passage therein for the electrophoretic migration of said particles, and in which said illuminating means illuminates the particles migrating in said passage.

3. The instrument defined in claim 1, in which said illuminating means comprises a laser light source.

4. The instrument defined in claim 1, in which said photodetector means produces said pulses with an amplitude related to the size of said migrating particles in said cell.

5. The instrument defined in claim 1, and which includes computing means coupled to said photodetector means for computing the velocity and Zeta potential for each migrating particle in response to the frequency of the electric pulses from said photo-detector means.

6. The instrument defined in claim 5, in which said computing means responds to the amplitude of the pulses received from said photodetector means to compute the size of said migrating particles.

7. The instrument defined in claim 6, in which said computing means includes means for counting the aforesaid particles per unit time to compute the total number of particles within a volume unit.

* * * * *